United States Patent [19]

Muraoka et al.

[11] Patent Number: 5,170,301
[45] Date of Patent: Dec. 8, 1992

[54] MAGNETIC HEAD HAVING CORE PARTS JOINED BY LOW-MELTING POINT CRYSTALLIZED GLASS WITH COMPOSITE GAP

[75] Inventors: Syunsaku Muraoka, Hirakata; Etsuko Suzuki, Neyagawa; Eisuke Sawai, Hirakata, all of Japan

[73] Assignee: Matsushita Electric Industrial Co., Ltd., Osaka, Japan

[21] Appl. No.: 762,739

[22] Filed: Sep. 18, 1991

Related U.S. Application Data

[63] Continuation of Ser. No. 386,251, Jul. 28, 1989, abandoned.

[30] Foreign Application Priority Data

Aug. 3, 1988 [JP] Japan ................. 63-194093

[51] Int. Cl.$^5$ ............... G11B 5/127; G11B 5/235; H01F 7/06
[52] U.S. Cl. ...................... 360/120; 29/603; 360/126
[58] Field of Search ............. 360/118, 120, 126; 29/603

[56] References Cited

U.S. PATENT DOCUMENTS

| | | | |
|---|---|---|---|
| 4,630,171 | 12/1986 | Dubuisson et al. | 361/321 |
| 4,656,547 | 4/1987 | Kumasaka et al. | 360/126 |
| 4,774,616 | 9/1988 | Kumasaka et al. | 360/118 |
| 4,788,611 | 11/1988 | Kabayashi et al. | 360/120 |
| 4,847,983 | 7/1989 | Satomi et al. | 360/127 |
| 4,851,942 | 7/1989 | Kumasaka et al. | 360/103 |
| 4,868,972 | 9/1989 | Miyakawa et al. | 360/125 |
| 4,890,378 | 1/1990 | Suzuki et al. | 360/127 |
| 4,941,064 | 7/1990 | Tottori et al. | 360/120 |
| 4,964,007 | 10/1990 | Satomi et al. | 360/120 |

FOREIGN PATENT DOCUMENTS

| | | |
|---|---|---|
| 0221697 | 5/1987 | European Pat. Off. . |
| 54-2841 | 2/1979 | Japan . |
| 55-108922 | 8/1980 | Japan . |
| 60-219607 | 11/1985 | Japan . |
| 61-214110 | 9/1986 | Japan . |

Primary Examiner—Aristotelis Psitos
Assistant Examiner—Jefferson Evans
Attorney, Agent, or Firm—Stevens, Davis, Miller & Mosher

[57] ABSTRACT

A head core includes a pair of core parts made of a magnetic metallic material and bonded together by (1) a gap material which is a low-melting-point crystallized glass which serves as the bonding material and (2) non-magnetic material layers provided between the glass and the gap surfaces of the core parts. The non-magnetic material layers effectively prevent reaction between the low-melting-point crystallized glass and the metallic magnetic material of the core during the bonding heat treatment. The strength of the magnetic gap, as well as dimensional precision of the same, is enhanced as compared with the conventional arrangement of the same gap size in which bonding is accomplished by a low-melting-point non-crystallizable glass, even when the bonding is executed at the same temperature. The invention remarkably improves magnetic head production yields and reliability.

1 Claim, 3 Drawing Sheets

MAGNETIC HEAD HAVING CORE PARTS JOINED BY LOW-MELTING POINT CRYSTALLIZED GLASS WITH COMPOSITE GAP

This application is a continuation of application Ser. No. 07/386,251, filed Jul. 28, 1989 now abandoned.

BACKGROUND OF THE INVENTION

1. Field of the Invention

The present invention relates to a magnetic head for use in a magnetic recording and reproducing apparatus such as a VTR.

2. Description of the Prior Art

Ferrite materials have been conventionally used as the material of magnetic head cores. In recent years, however, magnetic heads made of metallic magnetic materials having high levels of saturation magnetic flux density such as permalloy, sendust and an amorphous alloy have become popular in order to cope with the current demand for higher recording density and higher image quality. In general, a magnetic head core is composed of two separate core parts which are bonded together at gap surfaces. In order to achieve a high reliability, the bonding of the core parts is usually conducted by fusion of a glass. FIG. 3 is a perspective view of a head made of a known metallic magnetic material. The head core 11, which is made of a metallic magnetic material, is clamped by a pair of substrates 12. A magnetic gap is composed of a non-magnetic material 14 and the bonding of the core parts at the gap surfaces is accomplished by fusion of bonding glass 15 which fills grooves or recesses provided along a track.

When an amorphous alloy is used as the metallic magnetic material of the magnetic head core, it is not allowed to use such a bonding glass having a high melting point as that used in conventional ferrite cores, considering the magnetic characteristics of the amorphous alloy. In general, an amorphous alloy exhibits magnetization which becomes zero at the Curie point Tc and increases again when the temperature is raised to or beyond the crystallization temperature Tx, as shown in FIG. 4. In order to obtain excellent magnetic head characteristics, it is preferred that the magnetic permeability of the magnetic head is high. In order to obtain a high magnetic permeability, it is necessary to conduct a heat treatment at a temperature which is not lower than Tc and not higher than Tx, so as to eliminate any magnetic anisotropy in the magnetic film. Heating to a temperature above Tx causes the amorphous alloy to be crystallized so that the magnetic permeability is lowered. Practically, the crystallizing temperature Tx is about 500° C., while the Curie point Tc is about 450° C. considering the saturation magnetic flux density. This is the reason why a bonding glass having low softening and melting temperatures has to be used as the bonding glass for bonding core half parts made of an amorphous alloy. Softening point of glass may be lowered by increasing the lead content of the glass. A large lead content, however, makes the glass unstable resulting in various shortcomings such as reduction in the mechanical strength. For these reasons, glass having low softening points of 350° to 450° C. is practically used as the bonding glass for magnetic cores made of amorphous alloys.

Use of bonding glass having high melting point also is inhibited when the core is made of sendust or permalloy, because heating of such metallic magnetic material causes a separation of the core from the substrate at high temperature due to difference in the thermal expansion coefficient.

Magnetic head which will be referred to as MIG heads have been known in which a metallic magnetic material is used only in the region near the magnetic gap. This type of magnetic head also requires the use of bonding glass having a low melting point because a too high bonding temperature causes a diffusion between the metallic magnetic material and the ferrite to form a reaction layer which provides an effect resembling that of the gap.

Thus, the production of magnetic head cores from metallic magnetic materials cannot employ high bonding temperature due to restrictive conditions such as the crystallization temperature in case of an amorphous alloy, difference in the thermal expansion coefficient between the substrate and the core made of sendust or permalloy, and diffusion between the metallic magnetic material and ferrite in case of a MIG head. This essentially requires that bonding glasses having low melting points are used. Glasses having low melting points generally exhibit comparatively low levels of mechanical strength, tending to cause cracking at the gap region of the core during mechanical processing which is executed after the bonding, with the result that the yield of the magnetic head is reduced undesirably. In addition, glass having low melting points provides only low levels of bonding strength with the result that the gap size cannot be precisely controlled. These problems undesirably impair the reliability of the magnetic head cores of the type described.

SUMMARY OF THE INVENTION

Acccordingly, an object of the present invention is to provide a magnetic head which is capable of overcoming the above-described problems of the prior art.

To this end, according to the present invention, there is provided a magnetic head having a head core made of a metallic magnetic material and composed of two parts which are bonded together across a magnetic gap, i.e., a recording and reproducing gap characterized in that the magnetic gap is filled with a structure having a crystallized glass of a low melting point and sandwiched between layers of a non-magnetic material, so that the bonding of the head core parts across the magnetic gap is achieved by the crystallized glass of a low melting point while the layers of the non-magnetic material prevent reaction between the metallic magnetic material of the core half part and the crystallized glass of low melting point, whereby a high mechanical strength of the magnetic head and high precision of the narrow magnetic gap are attained.

In the heat treating process for bonding two head core parts at their gap surfaces, the glass of a low melting point still in amorphous state is held on the surfaces of the non-magnetic material layers on the gap surfaces of the core parts while the glass is in a molten state so as to bond the two core parts to each other. The glass is then crystallized so as to enhance its strength. During the bonding heat treatment, the non-magnetic material layers existing between both core parts and the low-melting-point crystallized glass effectively prevent reaction between the metallic magnetic core material and the glass, thereby preventing the magnetic characteristics of the core from being impaired. It is therefore possible to bond the core parts at such a low temperature as that used for amorphous glass, without allowing any reaction to take place between the glass and the metallic magnetic core material. After the bonding, the glass develops a high bonding strength so as to enhance the bonding strength between the head core parts, while attaining a high precision of the size of the narrow magnetic gap, thereby to offer a remarkable improvement in the yield and reliability of the magnetic heads.

DESCRIPTION OF THE PREFERRED EMBODIMENT

An embodiment of the present invention will be described with reference to the accompanying drawings, in particular to FIG. 1. A magnetic head core 1, which is composed of two parts, is made of a metallic magnetic material which is in this embodiment assumed to be an amorphous alloy. The magnetic head core 1 is sandwiched between substrates 2. The two parts of the magnetic head core 1 are bonded together at their gap surfaces, i.e., the surfaces facing a narrow magnetic gap, by fusion and crystallization of a low-melting-point glass 3 provided between layers 4 of non-magnetic material provided on the gap surfaces of the core parts of the head core 1. The low-melting-point crystallized glass used in this embodiment is a lead-containing glass which has a softening point of about 440° C. Numeral 6 denotes a layer of bonding glass.

Figure 2A:
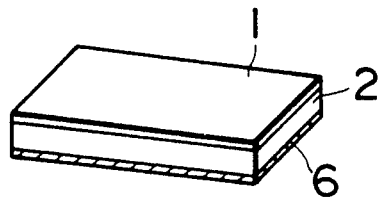
FIGS. 2a to 2e are perspective views illustrative of an embodiment of a production process in accordance with the present invention.

The process for producing a magnetic head in accordance with the present invention will be explained with reference to FIGS. 2a to 2c. Referring to FIG. 2a, an amorphous alloy layer 1, which is to be used as the magnetic head core part, is formed on the surface of a substrate 2 by a thin-film forming technique such as sputtering. A layer 6 of bonding glass is formed on the side of the substrate 2 opposite to the amorphous alloy layer, thus forming an element. In this embodiment, a low-melting-point crystallizable glass is used as the bonding glass. The amorphous alloy used in this embodiment has, for example, a saturation magnetic flux density of 8300 gauss, a crystallization temperature Tx of 575° C. and a Curie temperature Tc of 500° C.

Figure 1:
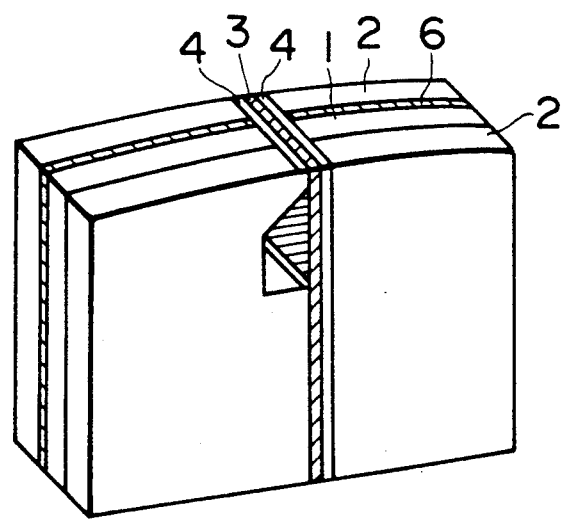
FIG. 1 is a perspective view of an embodiment of the magnetic head in accordance with the present invention.
Figure 3:
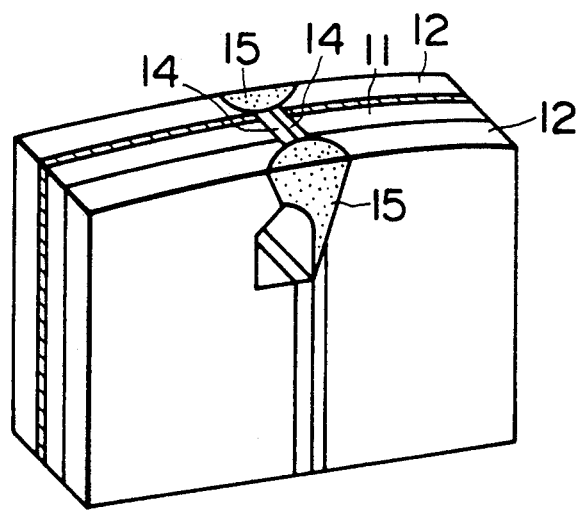
FIG. 3 is a perspective view of a known magnetic head.
Figure 4:
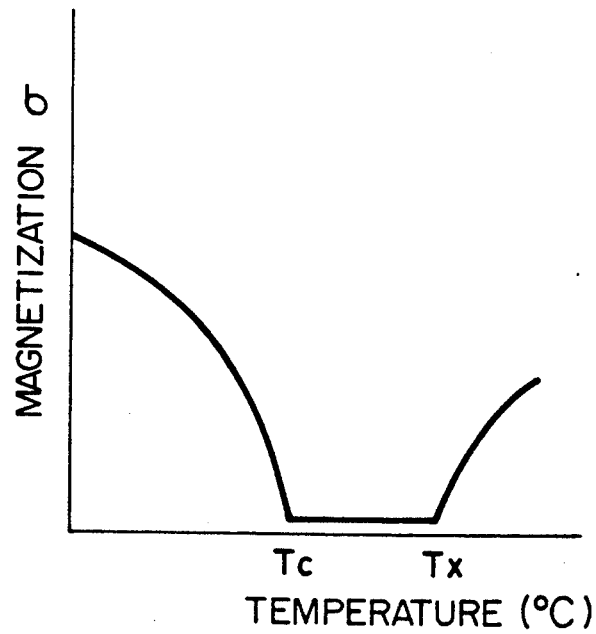
FIG. 4 is a graph showing a change in magnetization of an amorphous alloy in relation to temperature.
Figure 2B:
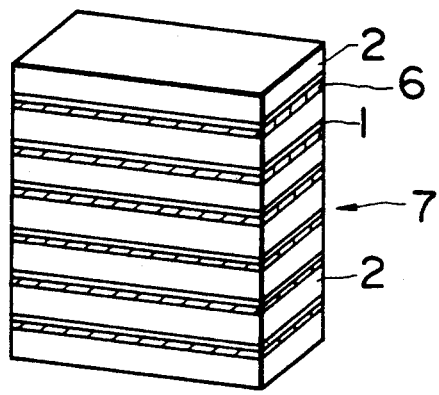

A plurality of elements shown in FIG. 1 are stacked as shown in FIG. 2b and pressed and heated so that a laminate block is formed. As a result of the heat treatment, the bonding glass layer 6 is crystallized so that the softening point is raised by about 100° C. as compared with the amorphous state of this glass, so that the bonding layers are not softened or peeled off when being subjected to a subsequent heat treatment.

Figure 2C:
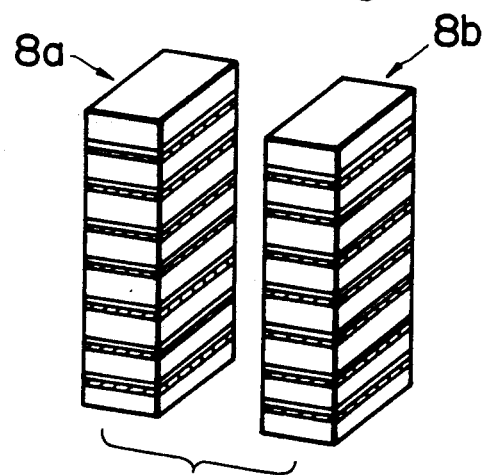
Figure 2D:
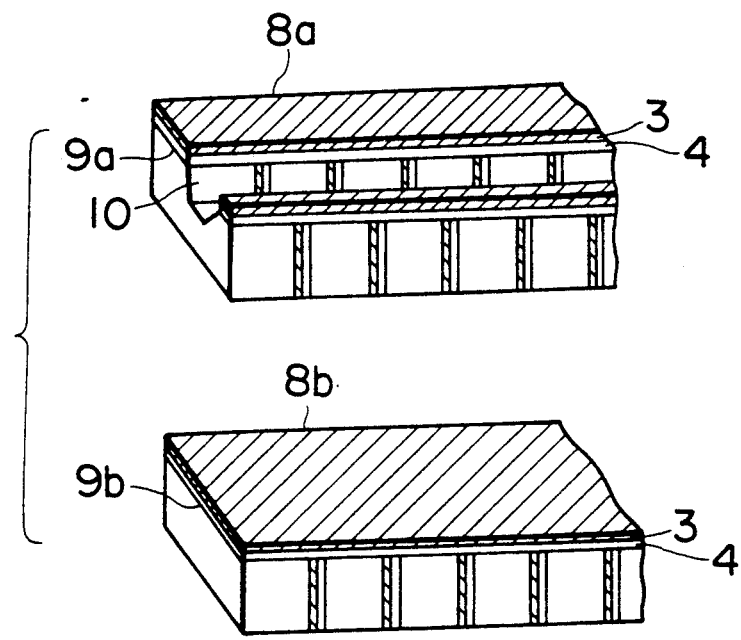

Then, the laminate block 7 is processed to form a pair of core bars 8a and 8b as shown in FIG. 2c.

Figure 2E:
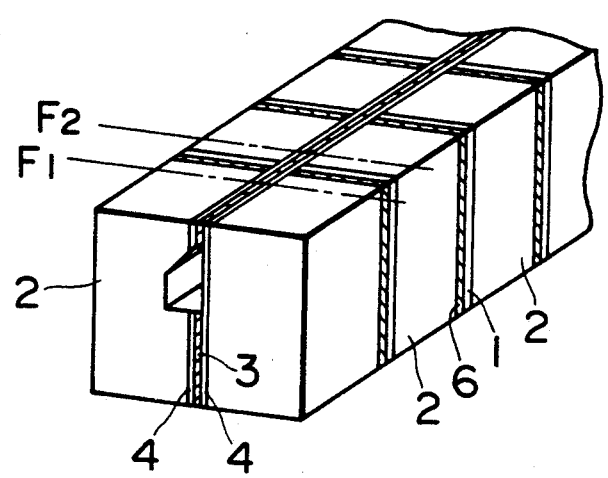

Then, a winding groove 10 for receiving windings is formed in the gap surface 9a of one bar 8a of the core bars, and the gap surfaces 9a, 9b of both core bars 8a, 8b are polished into a highly smooth state. Then, a layer or film 4 of a non-magnetic material such as SiO₂ or a high-melting-point glass is formed on the smoothed gap surfaces 9a and 9b to a predetermined thickness by, for example, sputtering. Then, a layer of a low-melting-point crystallizable glass 3 is formed to a predetermined thickness by, for example, spattering on the film 4 of the non-magnetic material on each core bar. The glass layer 3 formed on the surface of the non-magnetic material layer 4 is still in amorphous state because it is formed by sputtering. In the illustrated embodiment, the thickness of the non-magnetic material layer 4 is determined to be not smaller than 300 Angstroms and the thickness of the low-melting-point glass layer 3 is determined to be not smaller than 100 Å. Thereafter, the core bars 8a and 8b are brought together to abut against each other at their gap surfaces 9a and 9b and are subjected to a heat treatment. In consequence, the layers of the low-melting-point crystallizable glass 3 are molten and fused and then start to be crystallized, whereby the core bars 8a and 8b can be bonded together at their gap surfaces with a high mechanical bonding strength. In the conventional magnetic head core, the low-melting-point crystallizable glass tends to react with the amorphous alloy of the core material during the heat treatment so as to become fragile. This problem, however, is overcome by the present invention by virtue of the presence of the layer of a non-magnetic material such as SiO₂ or a high-melting-point glass formed between the crystallizable glass 3 and the gap surfaces of the two head parts so as to prevent reaction between the glass and the amorphous alloy used as the core material. An experiment has shown that satisfactory results for preventing the reaction can be obtained when the thickness of the non-magnetic material layer is 300 Å. Then, the bonded structure is cut along lines F1 and F2 shown in FIG. 2e so as to form a head of a predetermined width and the front surface of the thus formed head is polished, whereby a head tip as shown in FIG. 1 is completed. The magnetic head of the invention, produced by the method as described, offers a high yield and a high degree of precision of the gap size, thereby improving the reliability of the magnetic head.

Although a preferred embodiment has been described on an assumption that the core is made of an amorphous alloy, the described advantages are equally obtained when the invention is applied to cores made of other magnetic metallic materials such as sendust and permalloy.

It is also to be understood that the invention can equally be applied to a MIG head in which metallic magnetic material is arranged only in the vicinity of the magnetic gap, although a magnetic head of the described embodiment has a ma9netic core wholly made of a metallic magnetic material and sandwiched between substrates.

What is claimed is:

1. A method of manufacturing a magnetic head comprising a head core made of a magnetic material and comprising a pair of amorphous alloy core parts bonded together to provide a recording/reproducing gap therebetween, said method comprising:
    (a) providing a plurality of substrates, each of said substrates having first and second surfaces positioned opposite to one another;
    (b) forming an amorphous alloy layer and a bonding glass layer respectively on the first surface and the second surface of each of said plurality of substrates, said bonding glass layer being made of low-melting point crystallizable glass;

(c) stacking said plurality of substrates one upon another and then subjecting said substrates to a heat treatment to crystallize said bonding glass layer and to form a stacked block;

(d) cutting said stacked blcok into a first half and a second half to provide a first core bar and a second core bar each having a gap surface;

(e) forming a winding groove for receiving coil windings on said gap surface of said first core bar;

(f) polishing said gap surface of said first core bar and said second core bar;

(g) forming a non-magnetic layer made of high-melting point glass on said gap surface of each of said first core bar and said second core bar;

(h) forming a gap-forming layer of a low-melting point crystallizable glass over said non-magnetic layer on each of said first core bar and said second core bar;

(i) abutting said gap surface of said first core bar and said gap surface of said second core bar with each other;

(j) subjecting said first core bar and said second core bar to a heat treatment to bond said first core bar and said second core bar together to that said gap forming layer of said first core bar and said gap forming layer of said second core bar are melted and fused; said gap forming layer of said first core bar and said gap forming layer of said second core bar being crystallized to form a recording and reproducing gap made of a low-melting point crystallized glass and having a high mechanical strength; and (k) cutting said first core bar and said second core bar after being bonded in step (j) on both sides of each of said amorphous alloy layers between said plurality of substrates to obtain a plurality of magnetic heads having a predetermined thickness.

* * * * *